(No Model.)

G. S. MYRICK.
WOOD PLANING MACHINE.

No. 350,892. Patented Oct. 12, 1886.

WITNESSES:
Will de Powell
W C Chaffee

INVENTOR
Gilbert S. Myrick,
By Connolly Bros.,
Attorneys.

N. PETERS, Photo-Lithographer, Washington, D. C.

UNITED STATES PATENT OFFICE.

GILBERT S. MYRICK, OF PHILADELPHIA, PENNSYLVANIA, ASSIGNOR TO GOODELL & WATERS, OF SAME PLACE.

WOOD-PLANING MACHINE.

SPECIFICATION forming part of Letters Patent No. 350,892, dated October 12, 1886.

Application filed March 2, 1886. Serial No. 193,770. (No model.)

*To all whom it may concern:*

Be it known that I, GILBERT S. MYRICK, a citizen of the United States, residing at Philadelphia, in the county of Philadelphia and State of Pennsylvania, have invented certain new and useful Improvements in Wood-Planing Machines; and I do hereby declare the following to be a full, clear, and exact description of the invention, reference being had to the accompanying drawings, which form part of this specification, in which—

Figure 1:
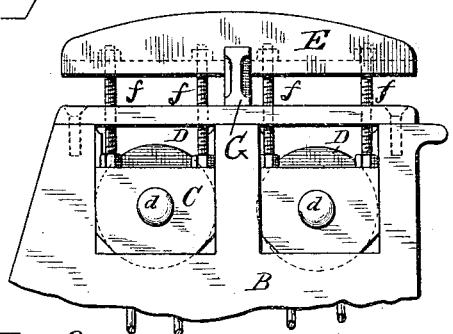
Figure 3:
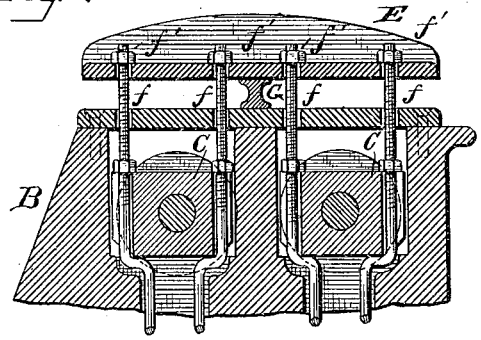
Figure 2:
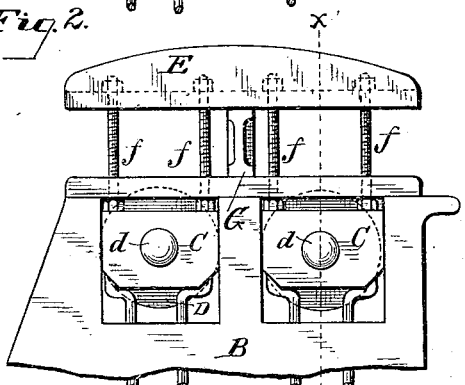
Figure 4:
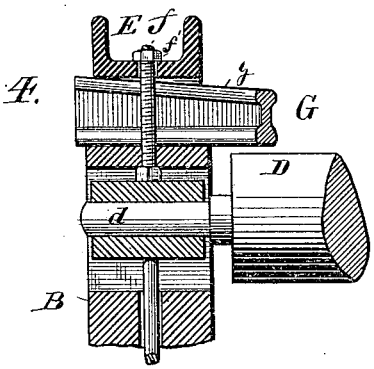
Figure 5:
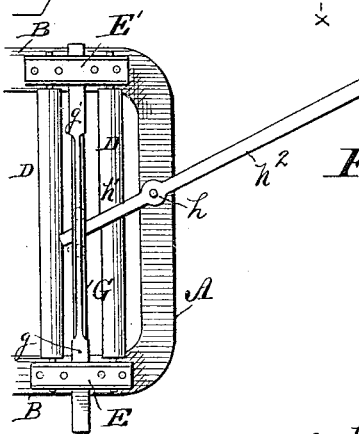
Figure 7:
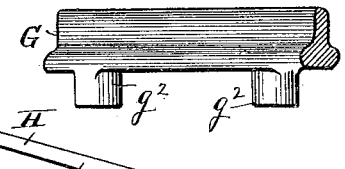
Figure 6:
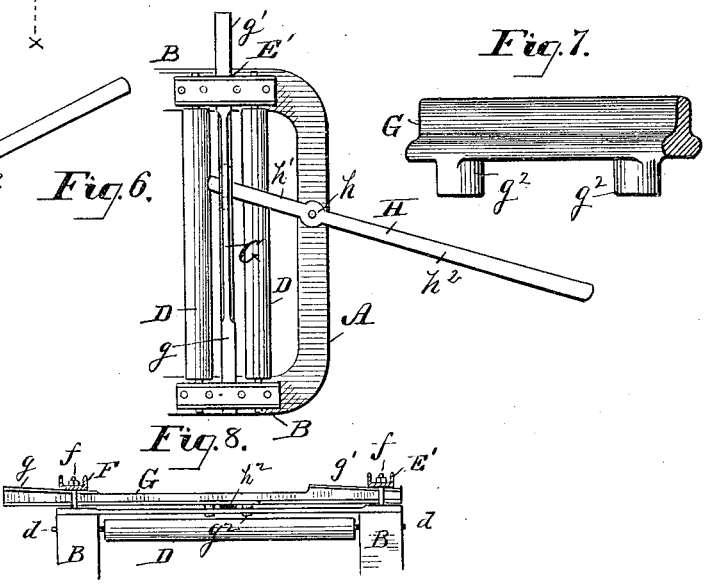
Figure 8:
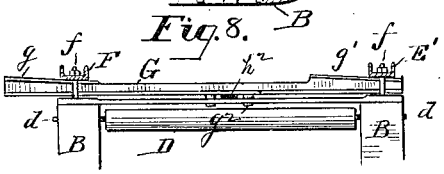

Figure 1 is an end elevation of feed-rolls in their bearings in the side of the frame, with connecting-yoke and tapering slide or wedge for raising the same, the bearings being shown in their lowest position. Fig. 2 is a side elevation of the same parts shown in Fig. 1, with the bearings elevated. Fig. 3 is vertical longitudinal section of parts shown in Fig. 1. Fig. 4 is a transverse vertical section on line $x\,x$, Fig. 2. Fig. 5 is a plan of diminished size of the end of a planing-machine with my improvements applied thereto, the lever and wedge or tapering slide being shown in the position which they occupy when the bearings of the feed-rolls are in their normal position. Fig. 6 is the same as Fig. 5, with the positions of the lever and wedge or tapered slide reversed, and rollers elevated. Fig. 7 is a detail perspective of the central portion of wedge or tapered slide, showing the bosses or projections between which the inner end of the operating lever fits. Fig. 8 is a front elevation of parts shown in Figs. 6 and 7.

My invention has reference to feed-rolls of planing-machines, and has for its object to provide means whereby such rolls may be readily raised to accommodate them to a piece of stuff of more than the ordinary thickness, and readily lowered again to bring them to position for working stuff of regular or ordinary thickness.

My invention consists, essentially, in the combination, with the vertically adjustable or sliding bearings of the feed-rolls of a planing-machine, of a wedge or tapered slide and a lever for operating the same, whereby a vibration or swing of the lever in one direction produces a longitudinal movement of the wedge or slide transverse to the frame of the machine, effecting an elevation of the feed-rolls, a reverse movement of the lever permitting the rolls to descend.

My invention further consists in the combination, with the two feed-rolls having vertically-adjustable bearings, of yokes connecting said bearings, a double wedge or tapering slide arranged to fit beneath such yokes, and a lever connected with such slide or wedge, whereby a single movement of the lever will simultaneously and equally elevate both of the upper feed-rolls, a reverse movement allowing both to descend simultaneously.

Referring to the accompanying drawings, A represents the feeding end of the frame of a planing-machine of the usual or any suitable construction, and B B the sides thereof, said sides having vertically-adjustable bearings C C, which receive the journals $d\,d$ of the feed-rolls D D. The two bearings on each side of the machine are connected by a yoke, E, the bolts $f\,f$, which support the bearings, passing through such yokes, and having nuts $f'$ above the latter. There are two yokes, E E', one on either side of the machine.

G represents a bar, which extends transversely over the machine, resting upon the sides B B thereof, and passing beneath the yokes E E'. This bar G is formed with two inclines, $g\,g'$, both of which taper in the same direction, and said bar may, therefore, be considered a double wedge, which, when moved in one direction, will elevate both yokes and the bearings connected therewith simultaneously, and when moved in the contrary direction will allow said yokes and their bearings to descend simultaneously, such descent being accomplished either by gravity or spring action.

To move the wedge or slide G in the direction of its length, and therefore transversely of the machine, I provide a long lever, H, pivoted at $h$ on the frame A of the machine, the inner end of its short arm $h'$ passing between two bosses, $g^2\,g^2$, or projections which depend from the under side of said slide, its other arm, $h^2$, extending beyond said frame, as shown. A vibratory movement or swing of the lever in one direction will move the bar or slide G longitudinally in such manner as to produce an elevation of the yokes E E', carrying the bearings of the feed-rolls upwardly and raising the feed-rolls. A reverse movement of the lever will cause the inclines of the bar G to be drawn outwardly from the yokes, permitting the latter to descend and the feed-rolls to be lowered. As the lever is quite long, a very considerable amount of power is exerted in its movement, so that the operator feeding the machine can readily raise both feed-rolls in an instant to any desired or necessary extent, and immediately lower the same, as occasion may require. This is quite important, owing to the variation that occurs in the thickness of stuff being fed to a planing-machine, and as it is quite difficult to feed a piece of unusual thickness where rolls are set or adjusted to receive stuff of or about a given thickness.

What I claim as my invention is—

1. The combination, with the feed-rolls, of a planing-machine having vertically-movable bearings, of a double-incline or double-wedge slide and a lever connected therewith for producing a movement of said slide, substantially as shown and described.

2. The combination, with the vertically-movable bearings of the feed-rolls of a planing-machine, of yokes connecting said bearings, a double-incline slide or wedge passing beneath said yokes, and a lever connected with said slide, whereby a vibration or swinging motion of the lever in one direction will move the slide longitudinally and elevate the feed-rolls, a reverse movement of the lever permitting said rolls to descend, substantially as shown and described.

3. The combination, with the vertically-movable feed-rolls of a planing-machine, of a slide or wedge, G, having two inclines, $g\ g'$, and projections or pendants $g^2\ g^2$, and a lever, H, fulcrumed on the machine, one of the arms of said lever passing between said projections, and the other arm extending beyond the frame of the machine, substantially as shown and described.

In testimony that I claim the foregoing I have hereunto set my hand this 1st day of March, 1886.

GILBERT S. MYRICK.

Witnesses:
WILL H. POWELL,
R. DALE SPARHAWK.